United States Patent
Ott et al.

(10) Patent No.: US 10,208,673 B2
(45) Date of Patent: Feb. 19, 2019

(54) FUEL DISPENSING APPARATUS AND METHOD OF OPERATION

(71) Applicant: United Technologies Corporation, Hartford, CT (US)

(72) Inventors: Joe Ott, Enfield, CT (US); Stanley J. Funk, Southington, CT (US); Roger O. Coffey, Glastonbury, CT (US); Shawn Stempinski, Simsbury, CT (US); John J. Rup, Jr., Willington, CT (US); Lyutsia Dautova, Rocky Hill, CT (US); Dennis M. Moura, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 705 days.

(21) Appl. No.: 14/790,951

(22) Filed: Jul. 2, 2015

(65) Prior Publication Data
US 2016/0003158 A1    Jan. 7, 2016

Related U.S. Application Data

(60) Provisional application No. 62/020,660, filed on Jul. 3, 2014.

(51) Int. Cl.
| | |
|---|---|
| *F02C 7/22* | (2006.01) |
| *F23R 3/28* | (2006.01) |
| *F23N 1/00* | (2006.01) |
| *F23R 3/14* | (2006.01) |
| *F23R 3/36* | (2006.01) |

(52) U.S. Cl.
CPC ............... *F02C 7/222* (2013.01); *F23N 1/00* (2013.01); *F23R 3/14* (2013.01); *F23R 3/28* (2013.01); *F23R 3/36* (2013.01); *F05D 2220/32* (2013.01); *F23N 2035/16* (2013.01); *F23R 2900/00001* (2013.01)

(58) Field of Classification Search
CPC .... F02C 7/222; F23R 3/36; F23R 3/14; F23R 3/28; F23R 2900/00001; F23N 1/00; F23N 2035/16; F05D 2220/32
See application file for complete search history.

(56) References Cited

U.S. PATENT DOCUMENTS

| | | | | |
|---|---|---|---|---|
| 2,930,191 A | * | 3/1960 | Schirmer | .................. F23R 3/26 60/738 |
| 3,444,898 A | * | 5/1969 | Caple | .................. F16L 55/1125 138/89 |

(Continued)

OTHER PUBLICATIONS

EP search report for EP15175316.7 dated Nov. 5, 2015.

*Primary Examiner* — Ted Kim
(74) *Attorney, Agent, or Firm* — O'Shea Getz P.C.

(57) ABSTRACT

A fluid dispensing apparatus that may be additive manufactured as one unitary piece and may be a fuel injector for a gas turbine engine includes a radial displacement bellows having an outer surface that faces and may be exposed to a surrounding environment and an interior surface that faces and may define at least in-part a flowpath extending along a centerline. The radial displacement bellows is constructed and arranged to move between an expanded state when a pressure differential between the environment and the flowpath is low to a restricted state when the pressure differential is high.

13 Claims, 5 Drawing Sheets

(56) References Cited

U.S. PATENT DOCUMENTS

| | | | |
|---|---|---|---|
| 4,350,372 A | * | 9/1982 | Logsdon .............. F16L 27/111 |
| | | | 285/226 |
| 5,242,117 A | | 9/1993 | DAgostino et al. |
| 5,361,578 A | * | 11/1994 | Donlan .................... F02C 3/30 |
| | | | 60/39.55 |
| 5,829,244 A | * | 11/1998 | Ciccia ...................... F23R 3/26 |
| | | | 60/39.23 |
| 6,715,292 B1 | | 4/2004 | Hoke |
| 7,007,864 B2 | | 3/2006 | Snyder et al. |
| 8,689,563 B2 | | 4/2014 | Low |
| 8,733,078 B2 | | 5/2014 | Alholm |
| 8,973,368 B2 | | 3/2015 | Dai et al. |
| 9,068,751 B2 | | 6/2015 | Snyder |
| 9,115,897 B2 | | 8/2015 | Snyder et al. |
| 2001/0003995 A1 | * | 6/2001 | Imaeda .............. F02M 37/0017 |
| | | | 156/244.11 |
| 2009/0200275 A1 | | 8/2009 | Twelves, Jr. et al. |
| 2009/0256003 A1 | * | 10/2009 | McMasters ............ B23P 6/007 |
| | | | 239/128 |
| 2011/0108127 A1 | | 5/2011 | Eriksen |
| 2014/0182292 A1 | | 7/2014 | Hudon et al. |
| 2015/0003997 A1 | | 1/2015 | Mironets et al. |

\* cited by examiner

FUEL DISPENSING APPARATUS AND METHOD OF OPERATION

This application claims priority to U.S. Patent Appln. No. 62/020,660 filed Jul. 3, 2014.

BACKGROUND

The present disclosure relates to a fuel dispensing apparatus, and more particularly to a fuel dispensing apparatus that includes a radial displacement bellows for flow control.

Flow control for fluid dispensing apparatuses such as fuel injectors for gas turbine engines require many operating parts including in-line electrically or pneumatically operated valves. In many instances the need to increase or decrease fluid flow may be due to changing pressure conditions. Manufacturing of such fluid dispensing apparatuses require many operating sub-systems and many individual parts that must be assembled, and is thus expensive and time consuming. Further, known fluid dispensing apparatuses may be heavy, are difficult to package, and because of the many operating parts may be expensive to maintain and/or repair. There exist needs in various industries to reduce the number of manufactured parts for fluid dispensing apparatuses, thereby providing more robust and simpler designs requiring less maintenance, reducing manufacturing time and costs, reducing weight, and simplifying packaging, amongst others.

SUMMARY

An additive manufactured fluid dispensing apparatus according to one, non-limiting, embodiment includes a radial displacement bellows having an outer surface exposed to a surrounding environment and an interior surface defining at least in-part a flowpath extending along a centerline, and wherein the radial displacement bellows is constructed and arranged to move between an expanded state when a pressure differential between the environment and the flowpath is low to a restricted state when the pressure differential is high.

Additionally to the foregoing embodiment, the radial displacement bellows is made of a metal.

In the alternative or additionally thereto, in the foregoing embodiment, the radial displacement bellows generally has a wall thickness of about 0.004 inches to 0.008 inches.

In the alternative or additionally thereto, in the foregoing embodiment, the radial displacement bellows has a plurality of axially displaced convolutions.

In the alternative or additionally thereto, in the foregoing embodiment, the apparatus includes a fluid dispensing spray nozzle defining in-part the flowpath.

In the alternative or additionally thereto, in the foregoing embodiment, the apparatus includes an axial displacement device defining in-part the flowpath, and wherein the device is axially extended when the radial displacement device is in the restricted state and retracted when the device is in the expanded state.

In the alternative or additionally thereto, in the foregoing embodiment, the nozzle is fixed.

In the alternative or additionally thereto, in the foregoing embodiment, the apparatus includes a rigid tube defining in-part the flowpath and located upstream of the radial displacement bellows and the axial displacement device; and a fluid dispensing spray nozzle defining in-part the flowpath and located downstream of the radial displacement bellows and the axial displacement device; and wherein the rigid tube and the spray nozzle are fixed.

In the alternative or additionally thereto, in the foregoing embodiment, the axial displacement device is a bellows.

In the alternative or additionally thereto, in the foregoing embodiment, the radial displacement bellows and the spray nozzle are manufactured as one unitary piece.

In the alternative or additionally thereto, in the foregoing embodiment, the apparatus is a fuel injector for a gas turbine engine.

A fuel injector for a gas turbine engine according to another, non-limiting, embodiment includes a radial displacement bellows having an outer surface facing a surrounding environment and an interior surface facing a flowpath extending along a centerline, and wherein the radial displacement bellows is constructed and arranged to move between an expanded state when a pressure differential between the environment and the flowpath is low to a restricted state when the pressure differential is high; and a fuel spray nozzle axially engaged to the radial displacement bellows and defining in-part the flowpath.

Additionally to the foregoing embodiment, the radial displacement bellows is made of a metal.

In the alternative or additionally thereto, in the foregoing embodiment, the radial displacement bellows generally has a wall thickness of about 0.004 inches to 0.008 inches.

In the alternative or additionally thereto, in the foregoing embodiment, the radial displacement bellows has a plurality of convolutions.

In the alternative or additionally thereto, in the foregoing embodiment, the spray nozzle is fixed.

In the alternative or additionally thereto, in the foregoing embodiment, the radial displacement bellows and the spray nozzle are additive manufactured as one unitary piece.

A method of operating a fuel injector according to another, non-limiting, embodiment, includes the steps of changing a pressure differential between an external environment of a bellows of the injector and an internal flowpath defined by the bellows; radially displacing the bellows via the changing pressure differential; and changing a fuel flow rate via the radial displacement.

Additionally to the foregoing embodiment, increasing the pressure differential moves the bellows toward a restricted state that decreases a flow cross sectional area of the flowpath at the bellows.

In the alternative or additionally thereto, in the foregoing embodiment, decreasing the pressure differential moves the bellows toward an expanded state that increases a flow cross sectional area of the flowpath at the bellows.

The foregoing features and elements may be combined in various combinations without exclusivity, unless expressly indicated otherwise. These features and elements as well as the operation thereof will become more apparent in-light of the following description and the accompanying drawings. It should be understood; however, that the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
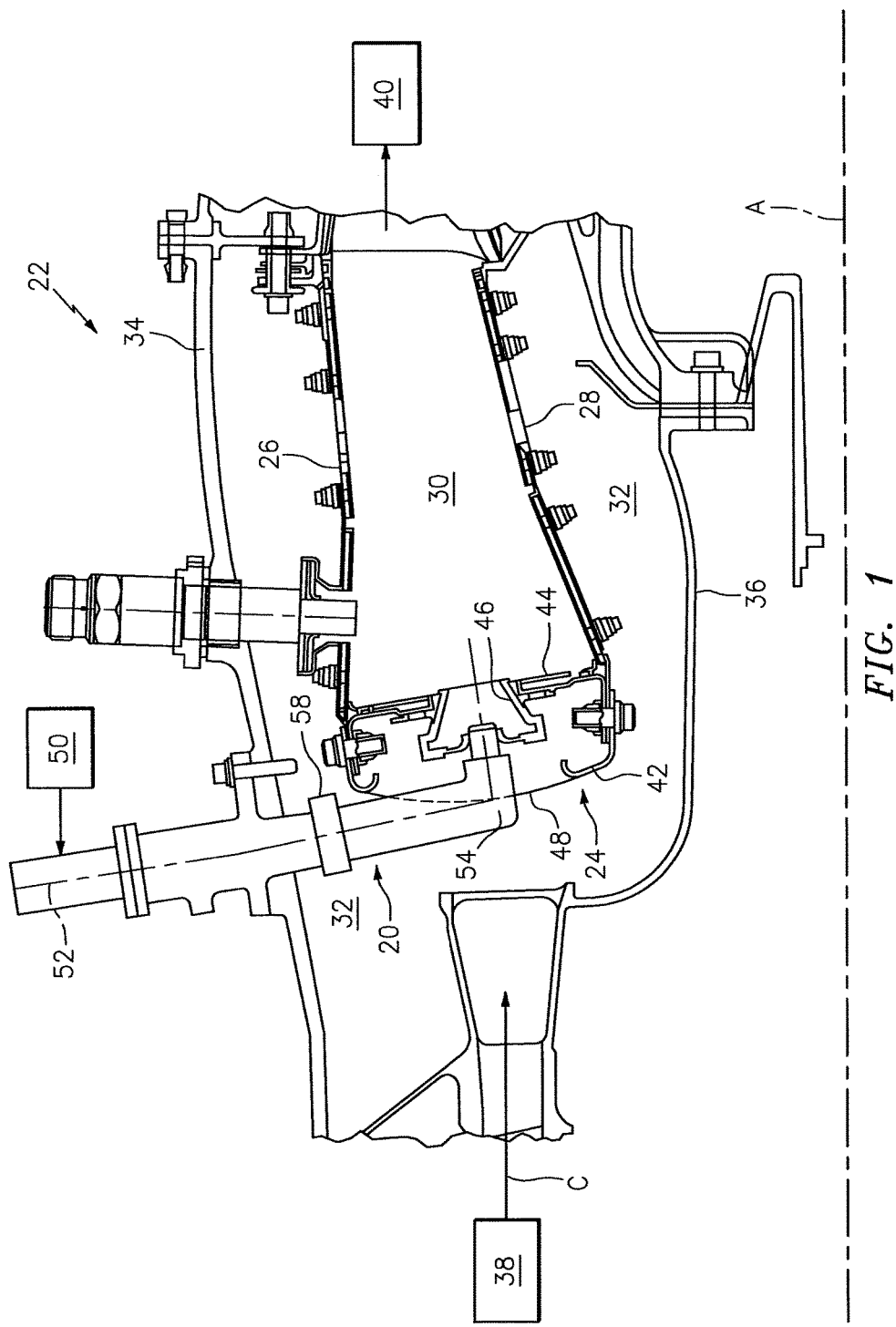
FIG. 1 is a cross section of a combustor of a gas turbine engine illustrating a fuel injector as an example of a fluid dispensing apparatus of the present disclosure.

FIG. 1 illustrates a fuel injector for a gas turbine engine as one, non-limiting, example of a fluid dispensing apparatus 20. The fuel injector 20 is part of a combustor 22 that may be annular in shape and concentrically disposed to an engine axis A. The combustor 22 may further include a bulkhead assembly 24, an outer wall 26, an inner wall 28, and a stationary structure or diffuser case module 34. The outer and inner walls 26, 28 project axially in a downstream direction from the bulkhead assembly 24, and radially define an annular combustion chamber 30 therebetween. An annular cooling plenum 32 is generally defined radially between the outer diffuser case module 34 and a diffuser inner case 36 of the engine. The bulkhead assembly 24 and walls 26, 28 are located in the cooling plenum 32 immediately downstream from a compressor section 38, and upstream from a turbine section 40 of the engine.

The annular bulkhead assembly 24 may extend radially between and is secured to the forward most ends of the walls 26, 28. Assembly 24 generally includes an annular hood 42, a wall or heat shield 44 that defines the axial upstream end of the combustion chamber 30, and a plurality of swirlers 46 (one shown) spaced circumferentially about engine axis A and generally projecting or communicating through the wall 44. A plurality of circumferentially distributed hood ports 48 accommodate a respective plurality of the fuel injectors 20 as well as direct compressed air C into the forward end of the combustion chamber 30 through the associated swirler 46.

The bulkhead assembly 24 introduces core combustion air into the upstream end of the combustion chamber 30 while dilution and cooling air is introduced into the combustion chamber 30 through the walls 26, 28 and from the plenum 32. The plurality of fuel injectors 20 and respective swirlers 46 facilitate the generation of a blended fuel-air mixture that supports combustion in the combustion chamber 30.

Each fuel injector 20 may receive fuel from at least one fuel manifold 50 generally located radially outward of the case module 34. The elongated fuel injector 20 may substantially extend longitudinally along a centerline 52 and in a radial inward direction with respect to the engine axis A, through the case module 34 and into the plenum 32. The centerline 52 and thus the injector 20 then bends (i.e. see bend portion 54) and projects in an axial downstream direction, extending through the hood port 48 and into the swirler 46 where fuel is then dispensed and atomized from the injector 20.

Figure 2:
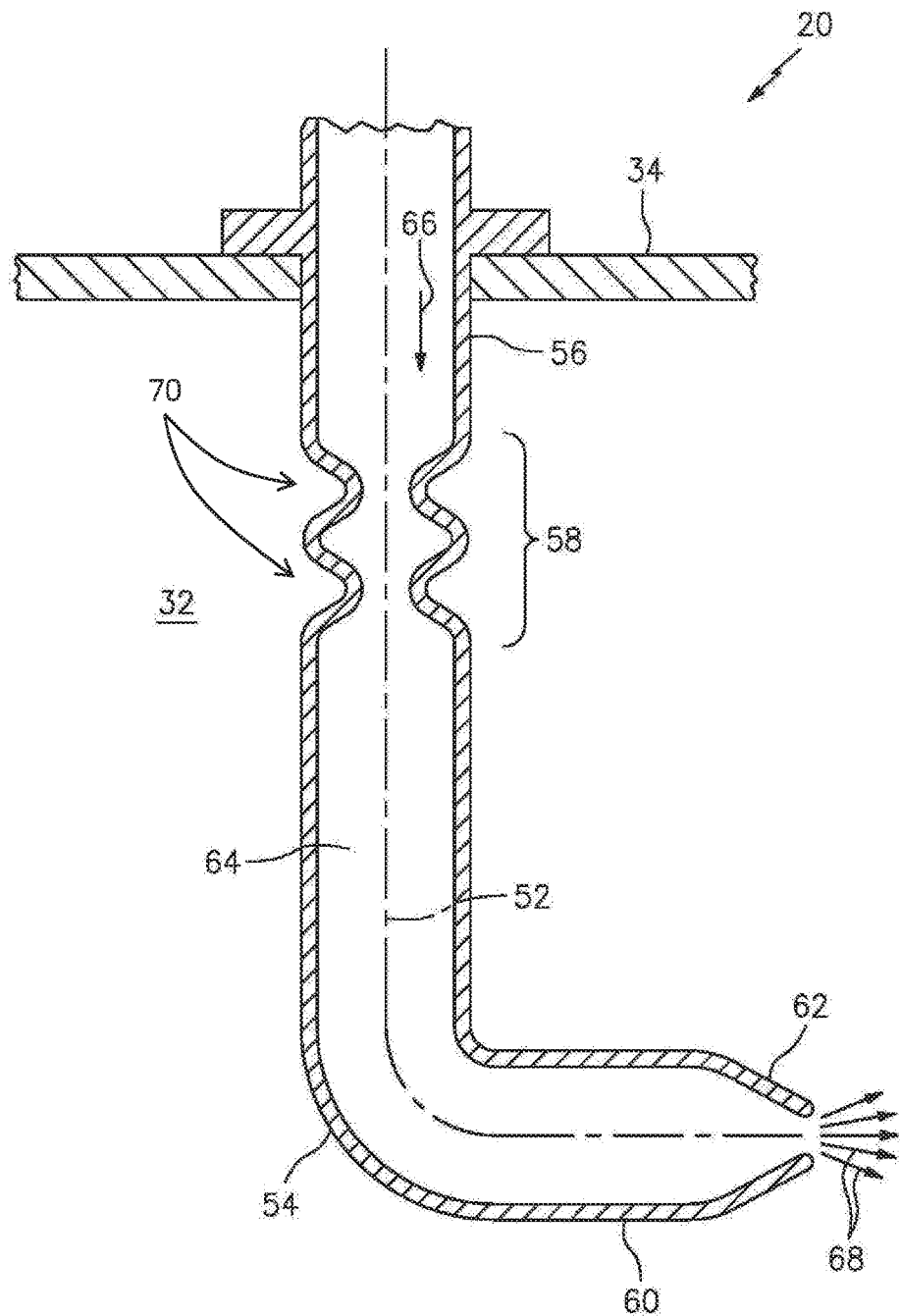
FIG. 2 is a cross section of the fluid dispensing apparatus.

Referring to FIGS. 1 and 2, the fluid dispensing apparatus 20 (i.e. a simplified fuel injector in the present example) may have a first tubular portion 56, a radial displacement bellows 58, the tubular bend portion 54, a second tubular portion 60 and a fuel nozzle 62. The tubular portion 56, the bellows 58, the bend portion 54, the tubular portion 60 and the nozzle 62, together, define a fluid flowpath 64 (for the flow of liquid fuel in the present example) that extends along the centerline 52. The first tubular portion 56 may project radially inward with respect to the engine axis A, through the stationary structure or diffuser case module 34 and to the radial displacement bellows 58 disposed in the plenum 32. The radial displacement bellows 58 may also extend radially inward and to the tubular bend portion 54. The bend portion 54 may be angled about ninety degrees and extends to the second tubular portion 60 that extends substantially in an axial downstream direction (with respect to the engine axis A) and to the nozzle 62.

Liquid fuel (see arrow 66) flows along the flowpath 64 and out of the nozzle 62 as a fuel spray (see arrows 68). The first tubular portion 56 may be fixed or rigidly engaged to the stationary structure 34 of the combustor 22. Similarly, the second tubular portion 60 and/or the nozzle 62 may be fixed and rigidly engaged to the stationary structure 34. It is further contemplated and understood that the first tubular portion 56, the second tubular portion 60 and/or the nozzle 62 may not be rigidly engaged to the stationary support structure 34, but may be generally indexed by or to the support structure to maintain approximate position while allowing for some motion due to vibration, thermal displacement and/or displacement due to operation of the bellows 58.

It is further contemplated and understood that for the present example of a fuel injector 20, the tubular portions 54, 56, 60 (or any part thereof) may be surrounded with a shielding wall that may be tubular in shape, or aerodynamic in shape to complement flow through the plenum 32. Although liquid fuel in the present example, the fluid 62 may also be a gas, liquid such as oil and water, or even a solid material (e.g. powder) capable of flow. It is further understood that the term "tube" or "tubular" also refers to conduits, casings, pipes and other structures capable of fluid flow.

Figure 3:
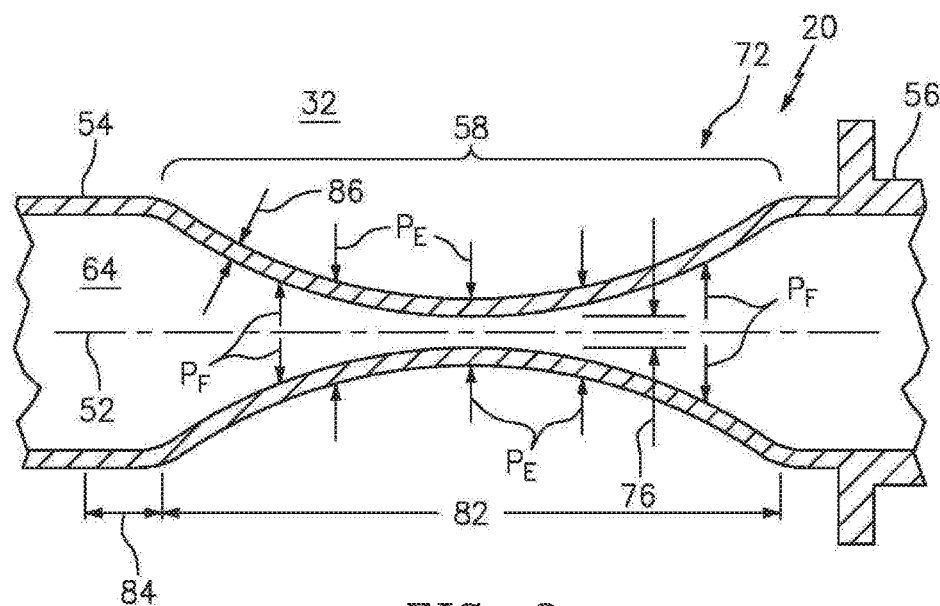
FIG. 3 is a partial cross section of the fluid dispensing apparatus illustrated in a restricted state.
Figure 4:
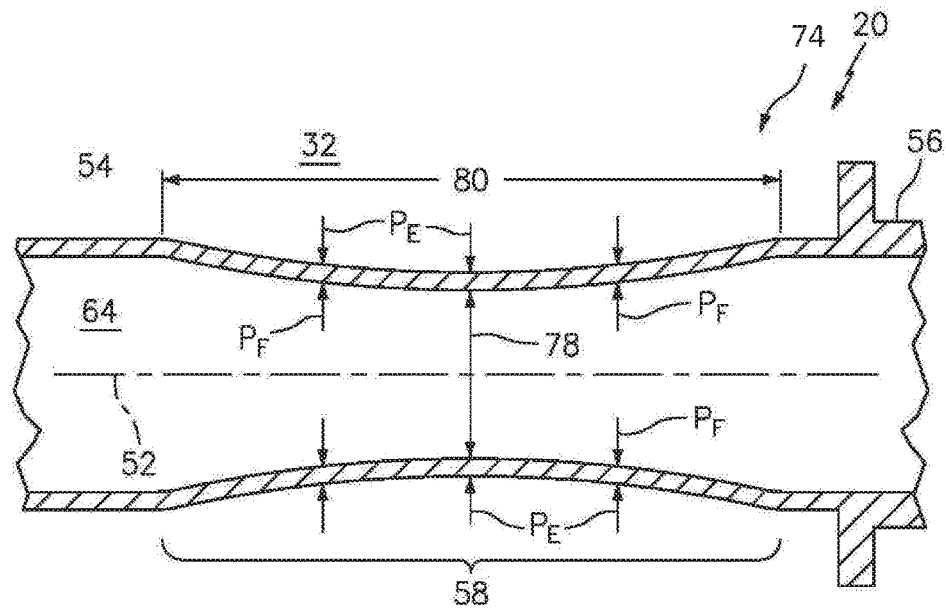
FIG. 4 is a partial cross section of the fluid dispensing apparatus illustrated in an expanded state.

Referring to FIGS. 2 through 4, the radial displacement bellows 58 may have one or a plurality of convolutions 70 (two illustrated in FIG. 2) each being compliant or flexible in response to changing pressure differentials measured between the surrounding environment or plenum 32 and the flowpath 64. The bellows 58 has a restricted state 72 and an expanded state 74. When in the restricted state 72 (see FIG. 3), the flowpath 64 generally at the bellows 58 has a diameter or cross sectional flow area 76 that is minimal (or zero indicating the injector 20 is closed). When in the expanded state 74 (see FIG. 4), the flowpath 64 generally at the bellows 58 has a diameter or cross sectional flow area 78 that is maximized (i.e. greater than flow area 76) indicating a fully open injector 20.

In operation, and if a pressure ($P_E$) in the surrounding environment 32 increases while a pressure ($P_F$) in the flowpath 64 remains substantially constant, the bellows 58 will flex and transition from the expanded state 74 and toward the restricted state 72. As this occurs, an axial length 80 of the bellows 58 (measured when the bellows are in the expanded state 74 and with respect to centerline 52) may decrease along with the cross sectional flow area 78 thereby reducing the rate of fluid flow in the flowpath 64. When the bellows 58 is in the fully restricted state 72 flow is minimal (or closed-off) and an axial length 82 of the bellows 58 is less than the axial length 80 by an axial displacement length 84. Engagement and/or indexing of the injector 20 to the stationary structure 34 may be constructed to allow for this axial displacement. It is further contemplated and understood that if pressure $P_E$ is held relatively constant and pressure $P_F$ is reduced, the bellows 58 may transition from the expanded state 74 and to the restricted state 72 as described above. Alternatively, if the pressure $P_E$ decreases while the pressure $P_F$ is held relatively constant, the bellows may transition from the restricted state 72 and toward the expanded state 74 increasing fluid flow. Or similarly, if the pressure $P_E$ is held relatively constant while the pressure $P_F$ increases, the bellows may transition from the restricted state 72 and toward the expanded state 74 increasing fluid flow.

The fluid dispensing apparatus 20 may be additive manufactured as one unitary and homogenous piece. Material compositions include, but are not limited to, nickel (e.g. INCONEL 718, 625), Waspaloy® (of United Technologies Corporation), Stellite® (of the Deloro Stellite Company), titanium, steels and stainless steels, cobalt, chrome, Hastalloy®X (of Haynes International Corporation), and others. A wall thickness 86 (see FIG. 3) of the radial displacement bellows 58 may be as low as about 0.004 inches (102 microns) and may fall within a range of 0.004 inches to 0.008 inches (102 to 203 microns) which may be easier to manufacture using current additive manufacturing techniques than more traditional methods. The wall thickness 86 may be any other dimension and is generally dependent upon the material composition of the bellows 58 (i.e. flexibility) and the magnitude of pressure differentials of any variety of applications.

Figure 5:
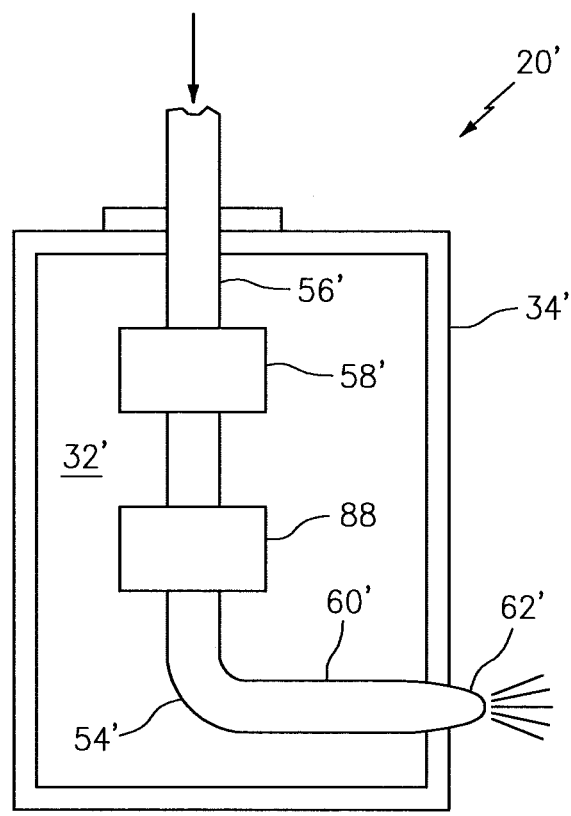
FIG. 5 is a schematic of a second embodiment of a fuel dispensing apparatus.

Referring to FIG. 5, a second embodiment of a fluid dispensing apparatus is illustrated wherein like elements have like identifying numerals except with the addition of a prime symbol. A fluid dispensing apparatus 20' is illustrated having a first tubular portion 56', a radial displacement bellows 58', a tubular bend portion 54', a second tubular portion 60' and a fuel nozzle 62'. The apparatus 20' may also have an axial displacement device 88 that may be located axially between the tubular portion 56' and the bellows 58', or, axially between the bellows 58' and the bend portion 54'. The axial displacement device 88 may be a bellows that does not substantially alter its flow cross sectional area but is capable of adjusting for any axial displacement of the radial displacement bellows 58'. The bellows 58' and the device 88 may be manufactured as one unitary and homogeneous piece through additive manufacturing. Because the axial displacement device 88 makes allowances for the axial displacement created by and via operation of the bellows 58', both ends of the fluid dispensing apparatus 20' may be rigidly engaged to a stationary structure 34'.

Examples of additive manufacturing processes include, but are not limited to, laser powder bed, electron beam melting, free form fabrication laser powder deposition and electron beam wire deposition, amongst others. Additive manufacturing systems include, for example, Additive Layer Manufacturing (ALM) devices, such as Direct Metal Laser Sintering (DMLS), Selective Laser Melting (SLM), Laser Beam Melting (LBM) and Electron Beam Melting (EBM) that provide for the fabrication of complex metal, alloy, polymer, ceramic and composite structures by the freeform construction of the workpiece, layer-by-layer. The principle behind additive manufacturing processes may involve the selective melting of atomized precursor powder beds by a directed energy source, producing the lithographic build-up of the workpiece. The melting of the powder occurs in a small localized region of the energy beam, producing small volumes of melting, called melt pools, followed by rapid solidification, allowing for very precise control of the solidification process in the layer-by-layer fabrication of the workpiece. These devices are directed by three-dimensional geometry solid models developed in Computer Aided Design (CAD) software systems.

Figure 6:
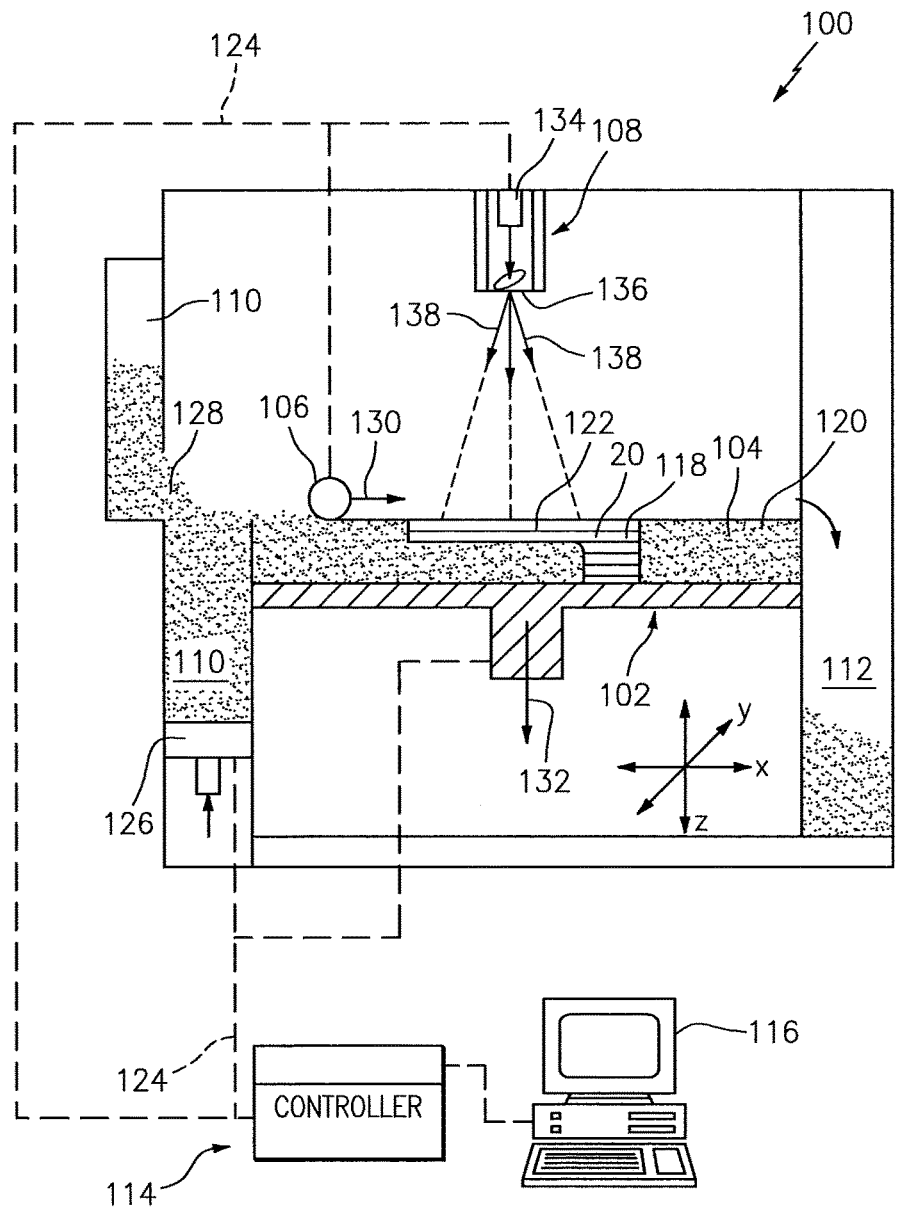
FIG. 6 is a schematic of an additive manufacturing system used to manufacture the fuel dispensing apparatus.

One example of an additive manufacturing system 100 capable of manufacturing either embodiments of the fluid dispensing apparatus is schematically illustrated in FIG. 6. The additive manufacturing system 100 has a build table 102 for supporting the apparatus 20 and generally holding a powder bed 104, a particle spreader, wiper or sprayer 106 for spreading, spraying or otherwise placing the powder bed 104 over the manufacture portion of the apparatus 20 and build table 102, an energy gun 108 for selectively melting regions of a layer of the powder bed, a powder supply hopper 110 for supplying powder to the spreader 106, and a powder surplus hopper 112. The additive manufacturing system 100 may be constructed to build the apparatus 20, or any portions thereof, in a layer-by-layer fashion. The powder bed 104 is composed of the same material composition as the apparatus 20 being additively manufactured.

A controller 114 of the additive manufacturing system 100 may include a computer 116 for entering data and that contains software for programming automated functions in accordance with inputted three dimensional computer aided design models of the apparatus 20. The model may include a breakdown of the apparatus 20 into a plurality of slices 118 additively built atop one-another generally in a vertical or z-coordinate direction. Each solidified slice 118 corresponds to a layer 120 of the powder bed 104 prior to solidification and each layer 120 is placed on top of a build surface 122 of the previously solidified slice 118. The controller 114 generally operates the entire system through a series of electrical and/or digital signals 124 sent to the system 100 components. For instance, the controller 114 may send a signal 124 to a mechanical piston 126 of the supply hopper 110 to push a supply powder 128 upward for receipt by the spreader 106. The spreader 106 may be a wiper, roller or other device that pushes (see arrow 130) or otherwise places the supply powder 128 over the build surface 122 of the apparatus 20 (or any portion thereof) by a pre-determined thickness that may be established through downward movement (see arrow 132) of the build table 102 controlled by the controller 114. Any excess powder 128 may be pushed into the surplus hopper 112 by the spreader 106.

Once a substantially level powder layer 120 is established over the build surface 122, the controller 114 may send a signal 124 to the energy gun 108 that energizes a laser or electron beam device 134 and controls a directional mechanism 136 of the gun 108. The directional mechanism 136 may include a focusing lens that focuses a beam (see arrows 138) emitted from device 134 which, in-turn, may be deflected by an electromagnetic scanner or rotating mirror of the mechanism 136 so that the energy beam 138 selectively and controllably impinges upon selected regions of the top layer 120 of the powder bed 104. The beam 138 moves along the layer 120 melting region-by-regions of the layer 120 at a controlled rate and power, melting each region into pools that then form with, or sinter to, the adjacent build surface 122, solidify, and ultimately form the next top slice 118. The process then repeats itself where another powder layer 120 is spread over the last solidified slice 118 and the energy gun 108 melts at least a portion of that layer along with a meltback region (i.e. sintering) of the previously solidified slice 118 to form a uniform and homogeneous apparatus 20, or portion thereof.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A fuel injector for a gas turbine engine, the fuel injector extending axially along a centerline and comprising:
   a radial displacement bellows having an outer surface facing a surrounding environment and an interior surface facing a flowpath extending along a centerline, wherein the radial displacement bellows is constructed and arranged to move radially relative to the centerline between an expanded state when a pressure differential between the environment and the flowpath is low to a restricted state that decreases a flow cross sectional area of the bellows when the pressure differential is high; and
   a fuel spray nozzle axially engaged, relative to the centerline, to the radial displacement bellows and defining in-part the flowpath;
   wherein the radial displacement bellows is configured to regulate a flow rate of fuel through the flowpath to the fuel spray nozzle by changing the cross sectional area of the bellows in response to variations of the pressure differential.

2. The fuel injector set forth in claim 1, wherein the radial displacement bellows is made of a metal.

3. The fuel injector set forth in claim 2, wherein the radial displacement bellows generally has a wall thickness of about 0.004 inches to 0.008 inches.

4. The fuel injector set forth in claim 1, wherein the radial displacement bellows has a plurality of convolutions.

5. The fuel injector set forth in claim 1, wherein the spray nozzle is fixed.

6. The fuel injector set forth in claim 1, wherein the radial displacement bellows and the spray nozzle are additive manufactured as one unitary piece.

7. The fuel injector of claim 1, wherein increasing the pressure differential moves the radial displacement bellows toward the restricted state and decreases a flow cross-sectional area of the flowpath within the radial displacement bellows.

8. The fuel injector of claim 1, further comprising:
   an axial displacement device defining in-part the flowpath;
   wherein the axial displacement device is axially extended, relative to the centerline, when the radial displacement bellows is in the restricted state and retracted when the radial displacement bellows is in the expanded state.

9. The fuel injector of claim 8, further comprising:
   a rigid tube defining in-part the flowpath and located upstream of the radial displacement bellows and the axial displacement device;
   wherein the fuel spray nozzle is located downstream of the radial displacement bellows and the axial displacement device; and
   wherein the rigid tube and the spray nozzle are fixed.

10. The fuel injector of claim 8, wherein the axial displacement device comprises a bellows.

11. The fuel injector of claim 1, wherein at least the radial displacement bellows and the fuel spray nozzle are configured as a monolithic body.

12. The fuel injector of claim 1, wherein a first portion of the flowpath extending along the centerline through the radial displacement bellows is angled relative to a second portion of the flowpath extending along the centerline through the fuel spray nozzle.

13. The fuel injector of claim 1, wherein
   a first portion of the centerline through the radial displacement bellows has a radial inward trajectory relative to an axis of the gas turbine engine; and
   a second portion of the centerline through the fuel spray nozzle has an axial trajectory relative to the axis of the gas turbine engine.

* * * * *